(12) United States Patent
Hintze et al.

(10) Patent No.: US 7,937,383 B2
(45) Date of Patent: May 3, 2011

(54) GENERATING ANONYMOUS LOG ENTRIES

(75) Inventors: Michael D. Hintze, Seattle, WA (US); Frederic H. Behr, Jr., Kirkland, WA (US); Randall F. Kern, Seattle, WA (US); Zijian Zheng, Shoreline, WA (US); Kimberly J. Howell, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 12/024,989

(22) Filed: Feb. 1, 2008

(65) Prior Publication Data
US 2009/0198746 A1 Aug. 6, 2009

(51) Int. Cl.
*G06F 17/30* (2006.01)

(52) U.S. Cl. .................................................... 707/706

(58) Field of Classification Search .............. 707/100, 707/102, 202, 706; 709/219
See application file for complete search history.

(56) References Cited

U.S. PATENT DOCUMENTS

| | | | |
|---|---|---|---|
| 5,381,545 A * | 1/1995 | Baker et al. | 714/19 |
| 6,470,269 B1 * | 10/2002 | Adar et al. | 701/219 |
| 7,107,269 B2 | 9/2006 | Arlein | |
| 7,162,473 B2 | 1/2007 | Dumais | |
| 7,458,512 B2 * | 12/2008 | Colson et al. | 235/386 |
| 2002/0051541 A1 * | 5/2002 | Glick et al. | 380/258 |
| 2005/0071465 A1 | 3/2005 | Zeng et al. | |
| 2005/0160427 A1 * | 7/2005 | Ustaris | 718/100 |
| 2006/0085454 A1 * | 4/2006 | Blegen et al. | 707/100 |
| 2006/0230058 A1 * | 10/2006 | Morris | 707/102 |
| 2006/0265232 A1 * | 11/2006 | Katariya et al. | 705/1 |
| 2007/0043706 A1 | 2/2007 | Burke | |
| 2007/0136237 A1 | 6/2007 | Barker | |
| 2007/0143860 A1 | 6/2007 | Hardt | |
| 2007/0219980 A1 | 9/2007 | Songfack | |
| 2008/0229231 A1 * | 9/2008 | Delia et al. | 715/781 |
| 2008/0294630 A1 * | 11/2008 | Yan et al. | 707/5 |
| 2009/0150518 A1 * | 6/2009 | Lewin et al. | 709/219 |

OTHER PUBLICATIONS

CNET Networks, Inc., "In their own words: Search engines on privacy," Published: Aug. 13, 2007, http://www.news.com/In-their-own-words-Search-engines-on-privacy—pages-2-2100-1029_3-6202047-2.html.
Ziff Davis Enterprise Inc., "Microsoft Gets Religious About Data Anonymization," Jul. 24, 2007, http://www.networking.eweek.com/article/Microsoft+Gets+Religious+About+Data+Anonymization/212142_1.aspx.
Electronic Frontier Foundation, "Google's New Plan to 'Anonymize' Search Logs: A Good First Step, But More is Needed," Mar. 2007, http://www.eff.org/deeplinks/2007/03/googles-new-plan-anonymize-search-logs-good-first-step-more-needed.

(Continued)

*Primary Examiner* — Etienne P LeRoux
(74) *Attorney, Agent, or Firm* — Shook, Hardy & Bacon L.L.P.

(57) ABSTRACT

Assigning session identifications to log entries and generating anonymous log entries are provided. In order to balance users' privacy concerns with the need for analysis of the log entries to provide high quality search results, non-user-specific data fields, such as a user's location (e.g., city, state, and latitude/longitude) and connection speed, are inserted into the log entries, and user-specific data fields, such as the IP address and cookie identifications, are deleted from the log entries. In addition or alternatively, prior to anonymization of the log entries, session identifications are assigned to identified groups of log entries. The groups are identified based on factors such as the user's identification, the IP address, the time of search, and differences between the search terms used in the search queries.

17 Claims, 3 Drawing Sheets

OTHER PUBLICATIONS

National Center for Supercomputing Applications University of Illinois, "Sharing Computer Network Logs for Security and Privacy: A Motivation for New Methodologies of Anonymization," Sep. 3, 2004, http://arxiv.org/PS_cache/cs/pdf/040910409005v1.pdf.

Pinsent Masons Out-Law.com, "Google will delete search identifiers after two years," Mar. 20, 2007, http://www.out-law.com/page-7888.

* cited by examiner

GENERATING ANONYMOUS LOG ENTRIES

BACKGROUND

Search engines have become increasingly necessary given the vast amount of information available on the internet. Traditionally, search engines collect information each time a search is performed, including information such as the search query, the IP address of the computer that was used to conduct the search, cookie identification information, and other information that could potentially be used to link a particular search to the user. Understandably, users have expressed privacy concerns regarding the practice of retaining user-identifying information in connection to their searches. These privacy concerns include the possibility of fraud, malicious access to users' information, and excess spam. Internet search companies, on the other hand, have traditionally retained IP addresses and cookie identifications to improve the quality of the search results. The IP address and cookie identifications for each search can be used to link search behaviors of the same user together, and can also help deliver targeted advertisements.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to generating anonymous log entries from original log entries. Original log entries may include user-specific data fields, such as those that have the potential to be used to track the search query to a specific user. In various embodiments, one or more non-user-specific data fields and corresponding values may be added to the original log entry, and one or more user-specific data fields and corresponding values may be deleted from the original log entry, so that the resulting log entry is anonymous, and cannot be used to track the corresponding search query to the user. The non-user-specific data fields and corresponding values that may be added to the original log entry include, but are not limited to, the physical location of the user (e.g., city and state) and the connection speed of the user's computing device.

In accordance with some embodiments, an original log entry may be copied prior to the addition or deletion of any data fields and corresponding values. The non-user-specific data fields and corresponding values are added to the copied log entry, and the user-specific data fields and corresponding values are deleted from the copied log entry, generating an anonymous log entry. In these embodiments, after validating the integrity of the anonymous log entry, the original log entry may be deleted to ensure complete user privacy.

In other embodiments, log entries from a common search session are identified and grouped together by analyzing items in the log entries such as, but not limited to, the identification of the user, the IP address corresponding to each original log entry, the time that the search took place, and the differences between the search terms used in each of the search queries. The log entries may then be assigned a session identification identifying the log entries as belong to a common search session.

BRIEF DESCRIPTION OF THE DRAWINGS

Embodiments of the present invention are described in detail below with reference to the attached drawing figures, wherein.

DETAILED DESCRIPTION

Figure 1:
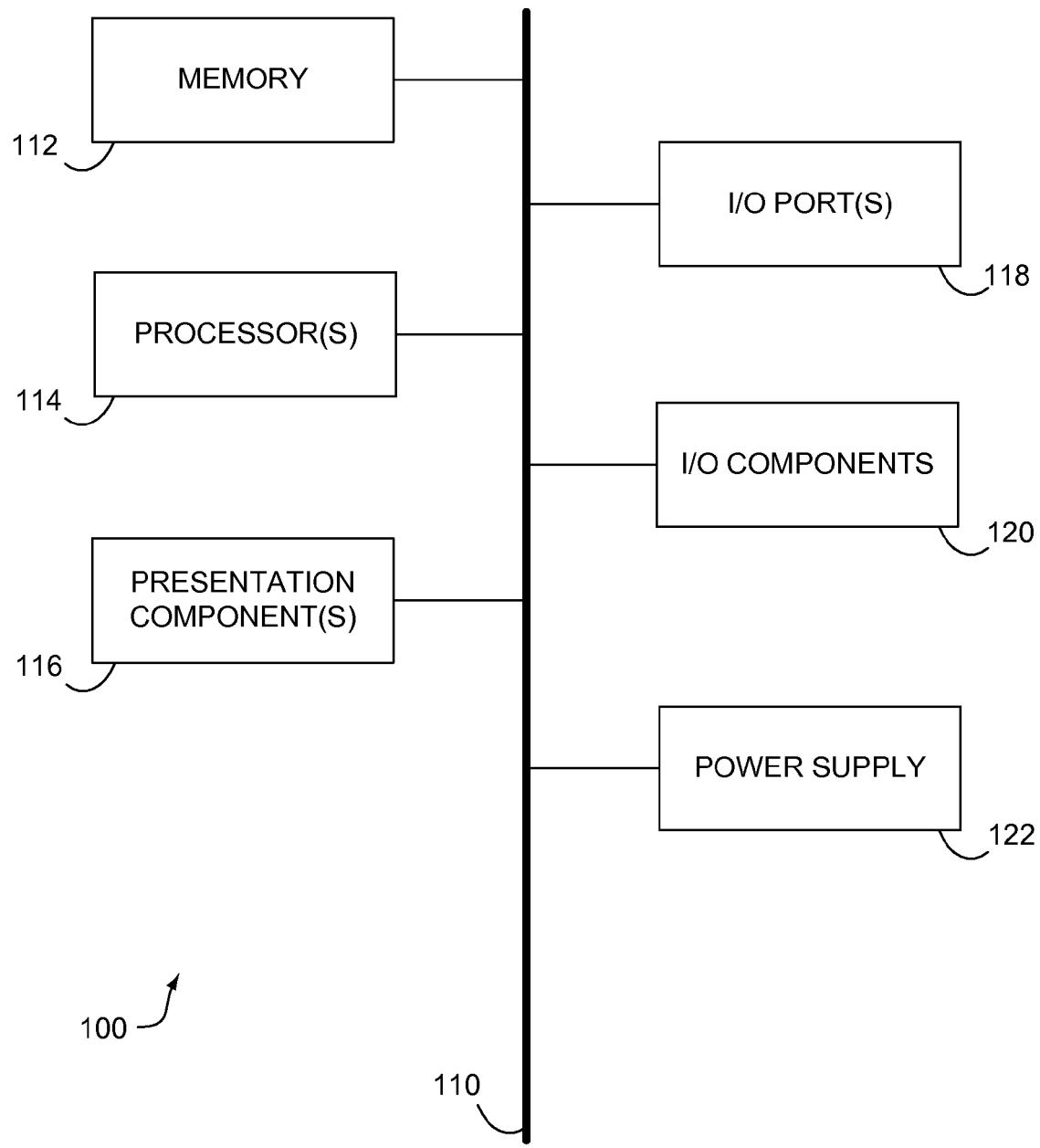
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed toward generating anonymous log entries from original log entries that contain user-specific information, such as information that can potentially be used to track the search query that corresponds to the log entry, to the user who performed the search. For instance, by completely deleting certain data fields and corresponding values within a log entry, such as user-specific data fields, the log entry becomes anonymous. As log entries are frequently analyzed by search engine companies to improve the quality of search results, additional data fields and corresponding values, such as non-user-specific data fields, may be inserted into a log entry to assist with the analysis despite the removal of user-specific data fields. Non-user-specific data fields may include, but are not limited to, the user's location (e.g., city, state, and latitude/longitude) and the connection speed of the computer used to perform the search. These types of data fields, while still holding the log entry's value for analysis, provide the search user with anonymity, thus providing privacy protection. Accordingly, in one aspect, an embodiment of the present invention is directed to a method for generating an anonymous log entry by inserting one or more non-user-specific data fields and corresponding values into the log entry and deleting one or more user-specific data fields and corresponding values from the log entry, thus generating an anonymous log entry. In one embodiment, all user-specific data fields and corresponding values are deleted from the log entry to provide complete anonymity.

In some embodiments, an anonymous log entry is generated by creating an exact copy of the original log entry, so that only the copy of the log entry is made anonymous, not the original log entry, thus creating an entirely new, and anonymous log entry. In these embodiments, the additions and deletions of data fields and corresponding values are made only to the copy of the log entry, not the original log entry. Additional data fields and corresponding values, such as the user's location (e.g., city, state, and latitude/longitude) and connection speed of the users' computer used to perform the search may be added to the copy log entry. In one embodiment, once the non-user-specific data fields and corresponding values are inserted into the copy log entry and the user-specific data fields and corresponding values are deleted from the copy log entry, the integrity of the now anonymous log entry is validated by comparing the anonymous log entry to the original log entry. If the anonymous log entry is properly validated, the original log entry may be deleted.

A further embodiment of the present invention is directed to assigning session identifications to log entries. For instance, a plurality of log entries may be contained in a particular search log, and each log entry may be associated with a particular search query. Based on an analysis of the log entries, the one or more groups of log entries may be identified as having similar characteristics. The analysis of the log entries may be based on one or more factors, such as, but not limited to, some form of user identification, the IP address, the time that the search took place, and the differences between the search terms used in each of the search queries. In embodiments, a session identification may be assigned to the log entries so that each log entry within a particular group of log queries is assigned the same session identification, allowing analysis of the log queries at a later time based on the session identifications. Further, once session identifications have been assigned, anonymous log entries may be generated from the original log entries enhanced with session identifications using the embodiments discussed above.

Having briefly described an overview of the present invention, an exemplary operating environment for the present invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computer 110 typically includes a variety of computer-readable media. Computer-readable media can be any available media that can be accessed by computer 110 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display, speaker, printing component, vibrating component, etc.

I/O ports 118 allow computing device 100 to be logically coupled to other devices, including I/O components 120, some of which may be built in. Illustrative components include a microphone, joystick, game pad, satellite dish, scanner, printer, wireless device, etc.

Figure 2:
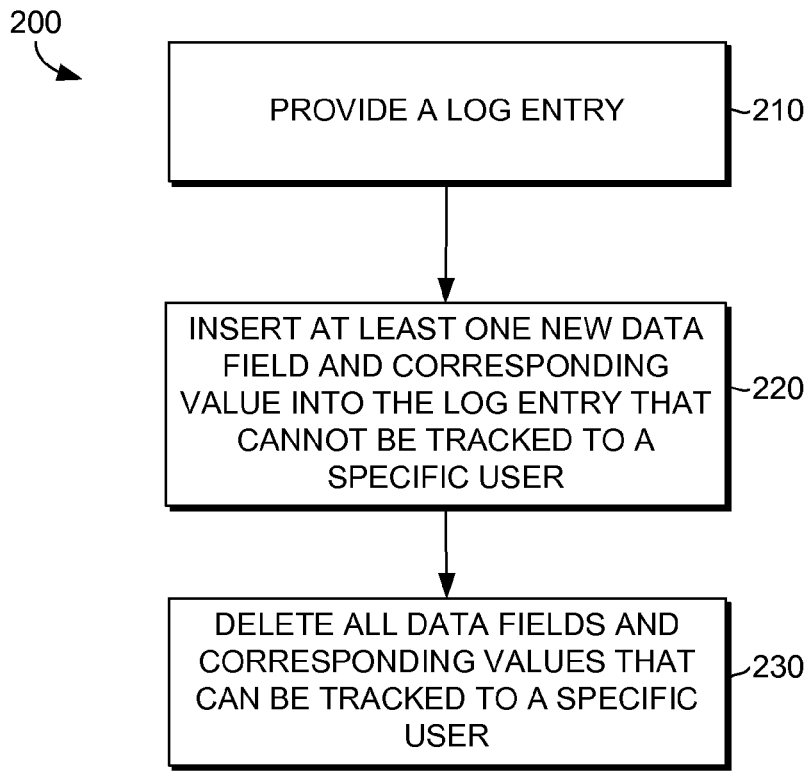
FIG. 2 is a flow diagram of a method for generating anonymous log entries, in accordance with an embodiment of the present invention.

As previously mentioned, embodiments of the present invention relate to generating anonymous log entries by deleting user-specific information from the original log entries. Referring to FIG. 2, a flow diagram is illustrated that shows a method 200 for generating anonymous log entries in accordance with an embodiment of the present invention. Initially, as indicated at block 210, a log entry is provided. A log entry is a web server record of a user's activity relating to a search. Log entries may contain information such as an IP address, the date and time of the search, the query terms, and cookie identifications. An IP address is a unique address that computer devices use to identify and communicate with each other on a computer network using the Internet Protocol standard. Cookies are parcels of text sent by a server to a web browser, and are used for authenticating, tracking, and maintaining specific information about users.

One or more new data fields and corresponding values are inserted into the log entry at block 220. As previously mentioned, the new data fields are non-user-specific, such that they are not able to be used to track the log entry to the user who performed the search. These new data fields may include, but are not limited to, the user's location (e.g., city, state, and latitude/longitude) and connection speed of the user's computer. To illustrate the relationship between data fields and corresponding values, if the new data field is the user's location, the corresponding value may include, but is not limited to, the name of the city, state, or latitude/longitude information regarding where the user is located.

After the new data fields and corresponding values have been inserted into the log entry, the user-specific data fields and corresponding values, or those that have the potential to be used to track the log entry to the user who performed the search, are deleted from the log entry, as indicated in block 230. The user-specific data fields that are deleted may include information such as the IP address, any cookie identifications, and any other information that has the potential to link the log entry to the user. As a result of the deletion of the user-specific data fields and corresponding values, an anonymous log entry is generated.

As previously mentioned, new non-user-specific data fields and corresponding values may be added to the log entries, and may include, but are not limited to, the user's location (e.g., city, state, and latitude/longitude) and the connection speed. This type of information can be found from a variety of sources. In one embodiment, the user's location and connection speed are found using an IP address database, which can be used to look up the known IP address from the log entry and provide associated information such as the user's location and connection speed. The IP address database may be provided by an internet service provider, for example. The user's location may be important to an internet search company when analyzing the log entries because a user's search results may vary depending on the user's location. For example, if one user is located in Los Angeles, Calif., and another user is located in Miami, Fla., and both users search for an Italian restaurant in their area, each user will receive different search results. In addition, connection speed is an important factor for internet search companies to analyze as it determines how long it takes to get a page of results back to the user who performed the search.

In other embodiments of FIG. 2, the log entry that is provided, or the original log entry, is first copied so that two identical log entries exist. For instance, the addition of the non-user-specific data fields and corresponding values and the deletion of the user-specific data fields and corresponding values may be made to the copy log entry, not the original log entry. Once the copy log entry is made anonymous, (e.g., only non-user-specific data fields in the copy log entry) the original log entry may be deleted, thus leaving only the anonymous log entry.

In one embodiment, before any data fields and corresponding values are inserted or deleted, it may be determined whether the original log entry is older than a pre-selected period of time (e.g., eighteen months). This limits the number of log entries that must be anonymized and provides for a balance between privacy concerns of users with the need for analyzing (e.g., by internet search companies) log entries to improve the quality of search results. Once it has been determined that a log entry is older than a pre-selected period of time, (e.g., the search performed by the user took place before a pre-selected period of time) the anonymization process takes place, using the methods discussed above.

In a further embodiment, in addition to deleting user-specific data fields and corresponding values from the log entry, other user-identifying information is deleted from the search query itself. This information may be deleted, or scrubbed from the search query to alleviate privacy concerns, and may include, but is not limited to, social security numbers, names, addresses, telephone numbers, and credit card numbers. For instance, a user who performs a search may use a person's name in the query to find more information about that person, or may use a telephone number in the query to find a person's name or address associated with that telephone number.

Figure 3:
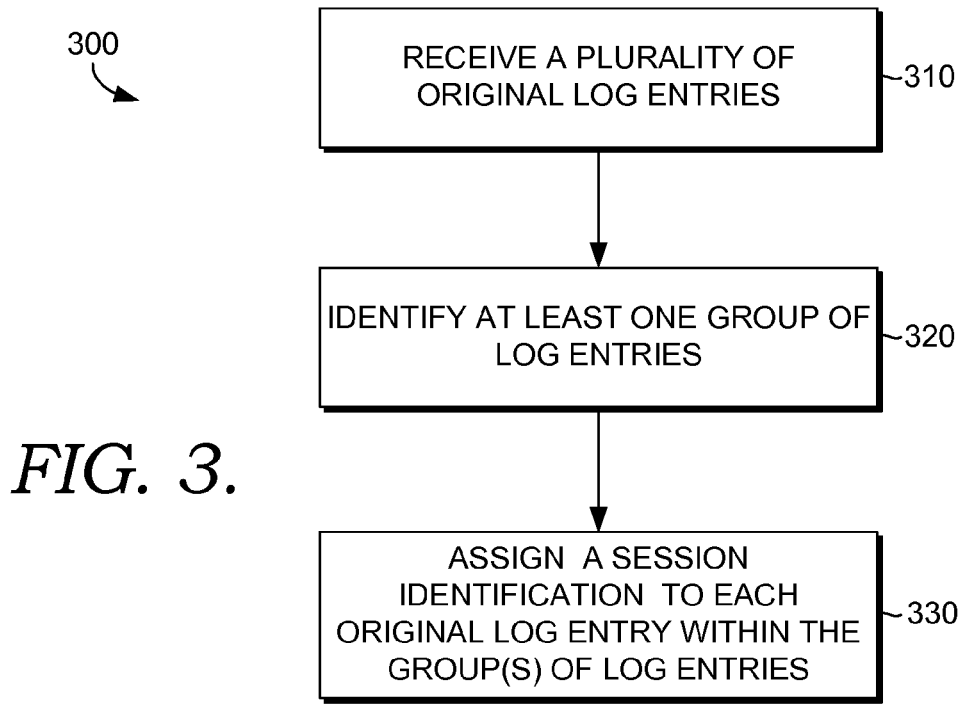
FIG. 3 is a flow diagram of a method for assigning session identifications to log entries, in accordance with another embodiment of the present invention.

Turning now to FIG. 3, a flow diagram is illustrated showing a method 300 for assigning session identifications to log entries, in accordance with an embodiment of the present invention. Initially, as indicated at block 310, a plurality of log entries are received. Once received, one or more groups of log entries are identified as belonging to one or more sessions, as indicated at block 320. In one embodiment, this step takes place prior to the anonymization process described in relation to FIG. 2 above. The log entries are analyzed based on at least one factor to identify and group log entries that appear to be from a common search session. These factors include, but are not limited to, the user's identification, the IP address, the time that the search took place, the difference between the search terms used in the search queries, and any combination of these. For example, a group of log entries may consist of those log entries that were created (e.g., time that the search took place) within a certain period of time, such as one day. As another example, a group of log entries may consist of those log entries that have the same user identification, and also may expand to incorporate the time of search as well so that more than one factor is used to identify the groups of log entries. As indicated in block 330, session identifications are assigned to the log entries. In one instance, session identifications are assigned only to the log entries that have been identified in a group of log entries. In another instance, all log entries are assigned a session identification number. In one embodiment, session identifications may be random, unique numbers. In another embodiment, the session identifications may be assigned in a specific order (e.g., time of search). In yet another embodiment, the same session identification is assigned to each log entry within the same group of log entries, such that more than one log entry is assigned the same session identification.

Once the session identifications have been assigned, the anonymization process described above may be used to convert the original log entries into anonymous log entries. These steps may include determining whether each original log entry is older than a pre-selected period of time, creating a copy log entry of each original log entry that has been determined to be older than a pre-selected period of time, inserting one or more non-user-specific data fields and corresponding values into the copy log entries, deleting the user-specific data fields and corresponding values, validating the integrity of the now anonymous log entry, and lastly, deleting the original log entries that correspond to the anonymous log entries.

Figure 4:
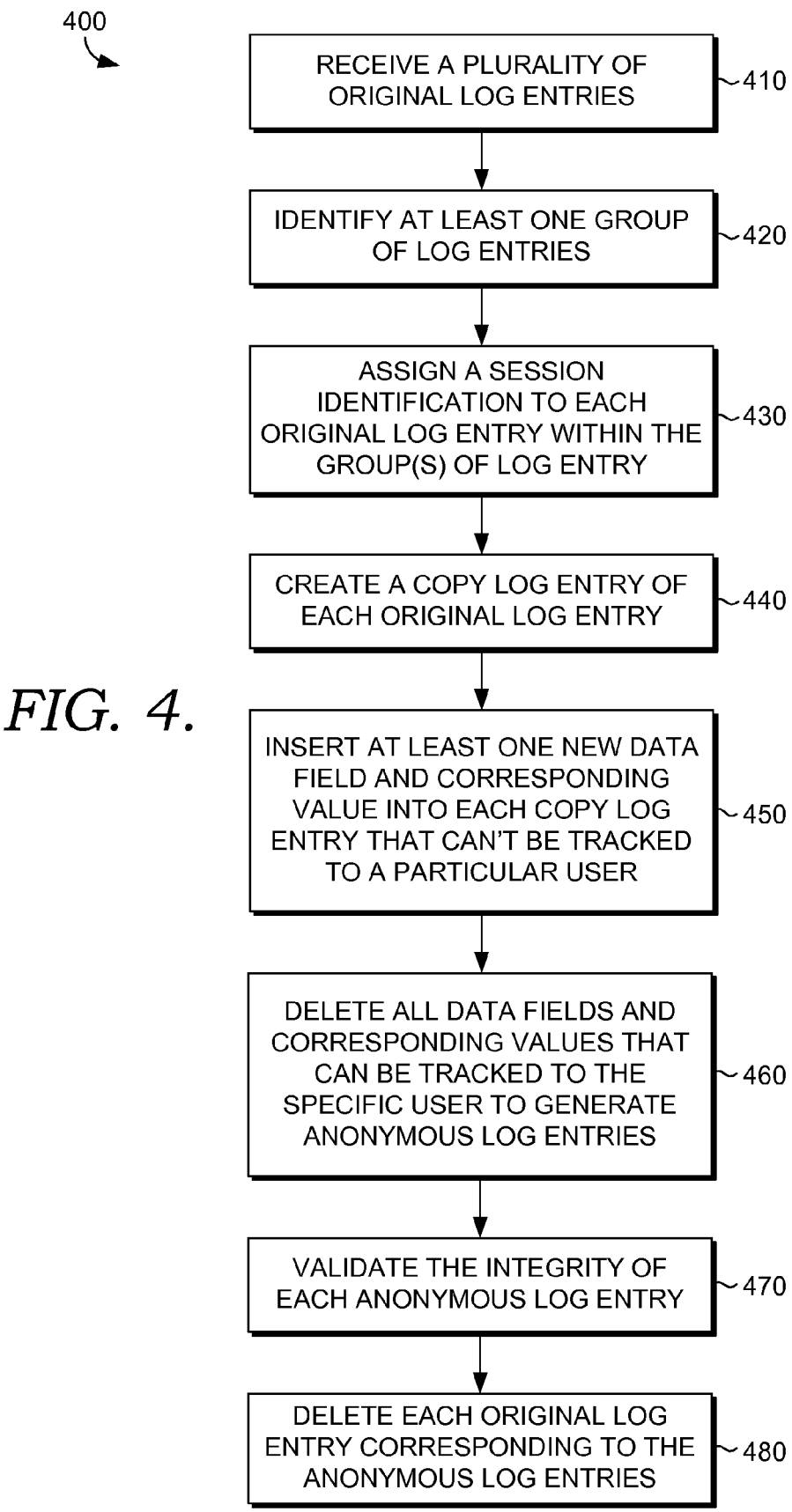
FIG. 4 is a flow diagram of a method for assigning session identifications to log entries in conjunction with generating anonymous log entries, in accordance with another embodiment of the present invention.

With reference to FIG. 4, a flow diagram is illustrated showing a method 400 of generating anonymous log entries in accordance with another embodiment of the present invention. Initially, a plurality of log entries are received as indicated in block 410. One or more groups of log entries are identified in block 420. This identification may be based on an analysis of the log entries, which takes into consideration factors such as the user's identification, the IP address, the time the search took place, the differences between search terms used in the search queries, and any combination of these factors. A session identification is assigned to the log entries within each group of log entries as indicated in block 430. Various embodiments of the assignation of session identifications are discussed above in reference to FIG. 3.

As indicated in block 440, a copy log entry of each original log entry is created. One or more new, non-user-specific data fields and corresponding values are inserted into the copy log entries, as indicated in block 450, and may include information such as, but not limited to, the session identification as assigned above, the user's location, and the connection speed. As discussed in reference to FIG. 2, the user's location and the connection speed, in one embodiment, may be inferred from an IP address database, such as one provided by an internet service provider.

Next, as indicated in block 460, all user-specific data fields and corresponding values, such as those that can be tracked to the user who performed the search, are deleted from the copy log entries, thus creating anonymous log entries. These data fields may include, but are not limited to, the IP address and cookie identifications, both of which can be used to track a log entry to a particular computer or user. Block 470 indicates that the integrity of each anonymous log entry is validated by comparing the anonymous log entry to the original log entry. Lastly, the log entries that correspond to the anonymous log entries are deleted, so as to leave only anonymous log entries, as indicated by block 480.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the methods. It will be understood that certain features and sub-combinations are of utility and may be employed without reference to other features and sub-combinations. This is contemplated by and is within the scope of the claims.

What is claimed is:

1. A computer-implemented method for generating anonymous log entries, the method comprising:
   providing a log entry that is a web server's record of a user's past browsing activity corresponding to an online search query;
   inserting at least one new data field and a corresponding value into the log entry, wherein the at least one new data field and the corresponding value cannot be used to track the log entry to a specific user, and wherein the at least one new data field is one or more of a user location or a connection speed; and
   deleting all data fields and corresponding values that can be used to track the log entry to the specific user from the log entry to generate an anonymous log entry.

2. The computer-implemented method of claim 1, further comprising:
   determining whether the log entry is older than a preselected period of time.

3. The computer-implemented method of claim 1, wherein the log entry is a copy log entry of an original log entry.

4. The computer-implemented method of claim 3, further comprising:
   validating the integrity of the anonymous log entry by comparing the anonymous log entry to the original log entry.

5. The computer-implemented method of claim 3, further comprising:
   deleting the original log entry that corresponds to the anonymous log entry.

6. The computer-implemented method of claim 1, wherein the one or more of the user location or the connection speed are retrieved from an IP lookup database using an IP address associated with the log entry.

7. The computer-implemented method of claim 1, wherein deleting all data fields and corresponding values that can be used to track the log entry to a specific user comprises deleting an IP address and each of a plurality of cookie identifications associated with the log entry.

8. The computer-implemented method of claim 1, further comprising:
   deleting a plurality of user-identifying information from the search query.

9. The computer-implemented method of claim 8, wherein the plurality of user-identifying information comprises the user's social security number, the user's name, the user's address, and the user's credit card number.

10. A computer-implemented method for assigning session identifications to log entries, the method comprising:
    receiving a plurality of original log entries that each correspond to a web server's record of a user's browsing activity associated with an online search query, wherein each of the plurality of original log entries is associated with a different search query;
    analyzing the plurality of original log entries based on at least one of a user identification, an IP address of a device associated with the user, or a time that the search queries were submitted;
    based on analyzing the plurality of original log entries, identifying at least one group of log entries such that the log entries that comprise the group of log entries appear to be from a common search session;
    assigning a session identification to each original log entry within the at least one group of log entries; and
    generating anonymous log entries from the plurality of original log entries by inserting at least one new data field that is one or more of a user location or a connection speed, and by deleting all data fields and corresponding values that can be used to track the anonymous log entries to a corresponding specific user, wherein the user location allows for knowledge of the user's general location instead of an identity of the user such that the user remains anonymous, and wherein the user location is one or more of a city, a state, a zip code, or latitude and longitude information associated with the user.

11. The computer-implemented method of claim 10, wherein the analysis of each original log entry is based on at least one of a user identification, an IP address, a time of search, a difference between a plurality of search terms used in each of the search queries, and any combination thereof.

12. The computer-implemented method of claim 10, further comprising:
    determining whether each of the plurality of original log entries is older than a preselected period of time.

13. The computer-implemented method of claim 12, further comprising:
    creating a copy log entry of each of the plurality of original log entries.

14. The computer-implemented method of claim 13, wherein the at least one new data field and the corresponding value cannot be used to track the log entry to a specific user.

15. The computer-implemented method of claim 14, further comprising:
validating the integrity of each of the anonymous log entries by comparing each anonymous log entry to the corresponding original log entry.

16. The computer-implemented method of claim 14, further comprising:
deleting the plurality of original log entries that correspond to the anonymous log entries.

17. One or more computer-readable media having computer-executable instructions embodied thereon that, when executed, perform a method for generating anonymous log entries, the method comprising:
receiving a plurality of original log entries that each correspond to a web server's record of a user's past browsing activity for an online search query, wherein each of the plurality of original log entries is associated with a different search query;
identifying at least one group of log entries, wherein the at least one group of log entries is based on an analysis of each original log entry, and wherein the analysis of each original log entry is based on at least one of a user identification, an IP address, a time of search, or a difference between a plurality of search terms used in each of the search queries;
assigning a session identification to each original log entry within the at least one group of log entries, wherein the session identification is not able to be tracked to a specific user;
creating a copy log entry of each of the plurality of original log entries, wherein the copy log entry of each of the plurality of original log entries includes user-identifying information that is also included in the corresponding original log entries;
inserting at least one new data field and a corresponding value into each of the copy log entries, wherein the at least one new data field and the corresponding value cannot be used to track the copy log entries to a specific user, and wherein the at least one new data field is at least one of a user location or a connection speed;
deleting all data fields and corresponding values that can be used to track the copy log entries to the specific user from the copy log entries to generate anonymous log entries;
validating the integrity of each of the anonymous log entries by comparing each anonymous log entry to the corresponding original log entry; and
deleting each of the plurality of original log entries that correspond to the anonymous log entries.

* * * * *